US00RE39827E

(19) United States
(12) Reissued Patent
Hoeting et al.

(10) Patent Number: US RE39,827 E
(45) **Date of Reissued Patent: *Sep. 11, 2007**

(54) VESSEL WITH MEASURING CAPABILITY

(75) Inventors: Michael G. Hoeting, Cincinnati, OH (US); Stephen C. Hoeting, Maineville, OH (US)

(73) Assignee: Helen of Troy Limited, St. Michael (BB)

( * ) Notice: This patent is subject to a terminal disclaimer.

(21) Appl. No.: 10/721,021
(22) Filed: Nov. 24, 2003

Related U.S. Patent Documents

Reissue of:
(64) Patent No.: 6,543,284
Issued: Apr. 8, 2003
Appl. No.: 09/908,529
Filed: Jul. 18, 2001

U.S. Applications:
(63) Continuation-in-part of application No. 09/313,686, filed on May 18, 1999, now Pat. No. 6,263,732.

(51) Int. Cl.
*G01F 19/00* (2006.01)

(52) U.S. Cl. ..... 73/427; 33/1 V; D10/46.2
(58) Field of Classification Search ..... 73/427, 73/426; 33/1 V, 1 F, 522, 67; 215/365, 366; 222/23, 25, 26; D10/46.2
See application file for complete search history.

(56) References Cited

U.S. PATENT DOCUMENTS

| | | | | |
|---|---|---|---|---|
| 153,159 | A | 7/1874 | Dinwiddie | 73/427 |
| 216,350 | A | 6/1879 | Pfitzenmeier | |
| 423,018 | A | 3/1890 | Young | |
| 1,507,968 | A | 9/1924 | Johnson | |
| 1,564,470 | A | 12/1925 | Crimmel | |
| 1,722,101 | A | 7/1929 | Little | 73/427 |
| 2,165,045 | A | 7/1939 | Garside | |
| 5,397,036 | A | 3/1995 | Maiwald | |
| 6,543,284 | B2 * | 4/2003 | Hoeting et al. | 73/427 |

FOREIGN PATENT DOCUMENTS

| | | |
|---|---|---|
| CA | 1106643 | 8/1981 |
| JP | S32-14894 Y1 | 11/1957 |
| JP | Y-33-12877 | 8/1958 |
| JP | S46-6066 Y1 | 3/1971 |
| JP | U-48-109968 | 3/1972 |
| JP | Y-56-18981 | 6/1976 |
| JP | U-54-25854 | 7/1977 |
| JP | S52-144761 | 11/1977 |
| JP | A-53-65759 | 6/1978 |
| JP | S52-25854 | 2/1979 |
| JP | U-56-21719 | 7/1979 |
| JP | U-58-86527 | 6/1983 |
| JP | U-58-104924 | 7/1983 |
| JP | A-10-253422 | 9/1998 |
| JP | A-11-254475 | 9/1999 |
| JP | 2000-304590 A | 11/2000 |

* cited by examiner

*Primary Examiner*—Christopher W. Fulton
(74) *Attorney, Agent, or Firm*—Seyfarth Shaw LLP

(57) ABSTRACT

A measuring vessel has cavity-defining wall structures and at least one ramp which rises from about the bottom of the wall structure toward the top of the wall structure. The at least one ramp has an upwardly directed surface with a lateral inner edge integral with portions of the wall structure below the ramp and a lateral outer edge integral with portions of the wall structure below the ramp. Indicia on the upwardly directed surface of the at least one ramp allows a user to look downwardly into the measuring vessel to visually detect the volume level of the contents in the vessel, thereby eliminating the need to look horizontally at the vessel at eye level. Preferably the vessel has two ramps, with at least one bearing indicia of standard English units, and another bearing indicia of metric units. In one embodiment a handle, covered with a cushioning grip sheath, is cantilevered from the top of the wall structure and has a distal end at the level of the bottom of the wall structure for cooperation therewith to support the vessel on an underlying support surface.

37 Claims, 3 Drawing Sheets

VESSEL WITH MEASURING CAPABILITY

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of U.S. application Ser. No. 09/313,686, filed May 18, 1999, entitled "Measuring Cup," now U.S. Pat. No. 6,263,732.

BACKGROUND

This invention relates to vessels for containing measurable contents. More specifically, this invention relates to a vessel having graduated indicia.

Vessels such as cups, bowls, spoons and the like which have a measuring capability are known. Such devices can be made from a variety of materials, including plastic, metal and glass. One of the most common measuring vessels found on the market today is a transparent measuring cup made of Pyrex® which is resistant to sudden changes in temperature to which it may be subjected during use.

The utility derived from a measuring vessel is related to the ease with which volumetric indicia on the measuring vessel's wall may be read by a user. Of course, any suitable units of measurement may be used to indicate the level to which contents have risen within a measuring vessel.

Traditional measuring vessels have indicia marked upon the measuring vessel wall in a manner which sometimes makes the indicia difficult to read, depending upon how precise a measurement is needed, the materials from which the measuring vessel is manufactured and the physical condition of the user, for example. In the case of a measuring cup which is made from transparent or translucent material, e.g., Pyrex®, the most precise way to measure the contents contained therein is to place the measuring cup upon a level surface, pour the contents to be measured into the measuring cup and then stoop down to the vertical level of the measuring cup to attempt to visually detect the bottom of a liquid meniscus or a level surface of solid contents. An alternative method of reading the level to which contents in a transparent or translucent measuring cup have risen is to lift the measuring cup to eye level and attempt to hold the measuring cup steady while visually detecting the volume. In either use, the observer is looking in a generally horizontal direction to detect the volume.

Prior art measuring cups that are opaque are more difficult to read than transparent or translucent measuring cups. In order to read the volume of contents held within an opaque measuring cup, a user must peer over the upper margin of the measuring cup to view, as closely as possible, the level to which contents have risen, either by stooping to the measuring cup's level or by lifting the measuring cup to eye level.

While the above-described methods for determining the volume of contents in a measuring cup may seem simple enough for most users, these methods can prove to be difficult for others. Users with bad knees, a bad back, or arthritis, for example, may not only have substantial difficulty in stooping over to accurately read the volume of contents in a measuring cup placed on a level surface, but may also have just as much difficulty in lifting a measuring cup to eye level and holding the cup steady to read the volume of contents held therein. When precise measurement of the volume of contents within a measuring cup is critical to a task, the simple actions of bending over or lifting a measuring cup to eye level, which seem easy to some users, may become difficult and uncomfortable for others.

Measuring the volume of cooking ingredients using prior art measuring cup can also be frustrating. As mentioned above, it an be difficult for a user to stoop over to read the level of contents when placed on a level surface or when lifted to eye level. An unsteady hand not only makes the volume of contents difficult to determine when a measuring cup is lifted to eye level, but a user may spill contents or even drop the measuring cup when attempting to do so.

Measuring vessels are not limited in their utility to the kitchen, of course. They may also be used for measuring proper ratios of solutions, e.g., antifreeze, the precise measurement of which is critical to its application and simplicity of determining a precise volume is necessary. Other common household solutions can be dangerous, e.g., toxic or caustic, and when a measuring vessel is filled with these solution the possibility of spilling them within the proximity of a child or a pet greatly increases when a measuring vessel must be raised to eye level to determine the volume of its contents.

It is an object of the present invention to simplify the way in which a person can accurately determine the volume of material held in a vessel.

It is another object of the invention to improve a measuring vessel to make it mote conducive to a simple and accurate volume determination.

SUMMARY

The present invention achieves the above-stated objectives by including with a vessel at least one sloped ramp having an upwardly directed surface having indicia which are readily observable by an observer looking downwardly toward the open end of the vessel.

The structure simplifies volume determination because there is no need for the observer to move relative to the vessel in order to look in a horizontal direction at the vessel indicia. Thus, the possibility of spilling is reduced. Also, since the ramp preferably rises continuously and gradually from the bottom of the vessel, a user who is filling the vessel from above can actually see the volume indicia on the upwardly directed surface of the ramp while the vessel is being filled, looking along the same line of sight generally used during filling. These advantages result from the ability to visually determine the volume of the contents of the vessel by simply looking into the open upper end, and the gradual slope of the ramp.

According to a first preferred embodiment of the invention, a cup has wall structure including a bottom wall and an encircling vertical side wall, so that the cup is cylindrical in shape with an open upper end. Inside the cup, at least one ramp slopes continuously upward from the bottom wall toward the open upper end. The ramp includes an upwardly directed surface bearing printed volume indicia viewable through the open upper end to visually determine the volume of cup contents. Preferably the cup has two ramps formed integrally along the side wall, with one bearing standard English units of measurement and the other bearing metric units. The two ramps have oppositely located bottom ends and oppositely located top ends. The cup also has a handle and a spout, with the handle located adjacent one ramp and the spout located adjacent another.

In a second embodiment, the side wall is sloped somewhat, rather than vertical. The cup includes two integral, oppositely located ramps with adjacently located bottom ends and adjacently located top ends. The top ends feed toward the spout, and again, one ramp bears indicia in standard English units and the other bears metric indicia.

In another embodiment, the handle is cantilevered from the side wall and has a vertical grip portion terminating at a distal end in the plane of the bottom wall to provide additional self-support, and covered with an elastomeric grip sheath.

With any embodiment, the cup can be formed of any suitable material and via any suitable process, although transparent and moldable material is preferred and manufactured using a molding process is also preferred.

Certain ones of these and other features may be attained by providing a vessel comprising: a wall structure defining a cavity with an open upper end for receiving contents having a measurable volume, a continuous ramp extending upwardly from adjacent to a lower end of the wall structure, and indicia positioned on the ramp so as to be observable by a user looking downwardly toward the open upper end and providing a readily observable indication of the volume of the contents of the vessel.

These and other features will be more readily understood in view of the following detailed description and the drawings.

DETAILED DESCRIPTION

Figure 1:
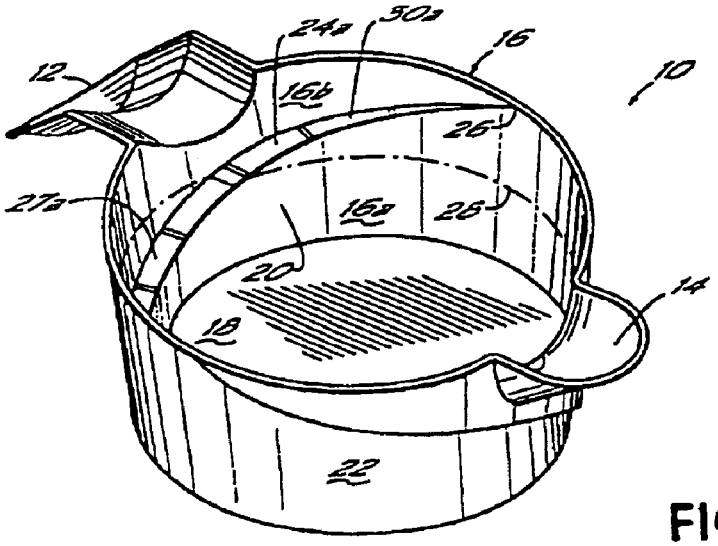
FIG. 1 is a perspective view of a measuring cup according to a first preferred embodiment of the invention.
Figure 2:
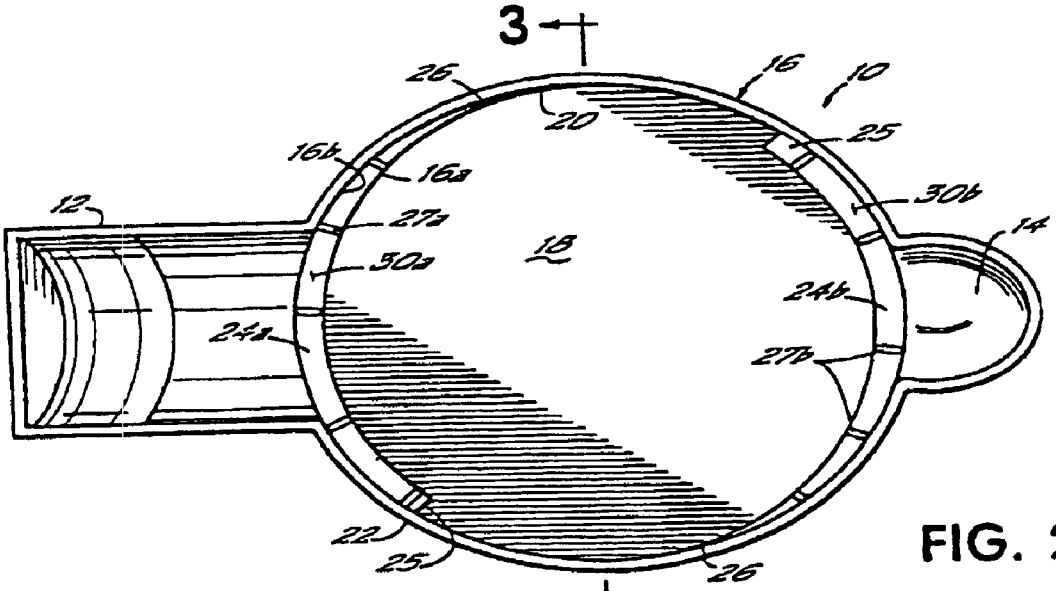
FIG. 2 is a top plan view of the measuring cup of FIG. 1.
Figure 3:
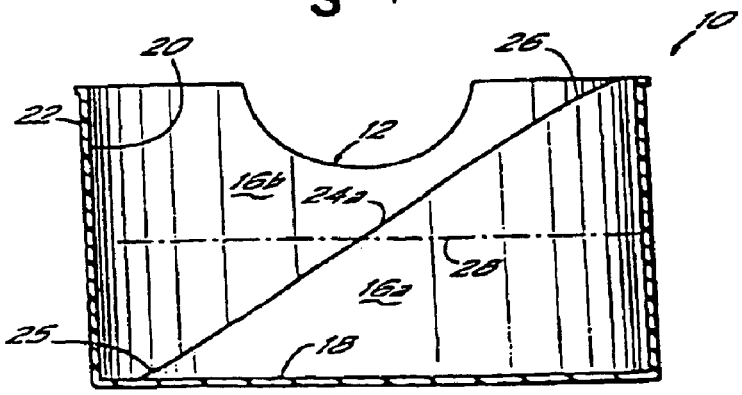
FIG. 3 is a cross-sectional view of the measuring cup of FIG. 2 taken along lines 3—3.

FIGS. 1–3 show a first preferred embodiment of the present inventive vessel in the form of a measuring cup 10. Generally, the measuring cup 10 is integrally formed of a suitable material and has a handle 12 and a spout 14 integrally attached to a substantially vertical side wall 16. The measuring cup 10 has a base or bottom wall 18 integrally attached around its perimeter to the bottom edge of the side wall 16. The side wall 16 cooperates with the bottom wall 18 to form wall structure which defines a cavity which has an open upper end.

The wall 16 has an inside surface 20 and an outside surface 22 from which ramps 24a, 24b are formed in relief. The measuring cup is of unitary, one-piece construction, molded from any suitable food grade plastic known in the art. However, it will be understood that the measuring cup 10 may be manufactured by any suitable process. It will also be understood that the measuring cup 10 may be made of any other suitable material known in the art, e.g., Pyrex® or metal.

The ramps 24a, 24b are located on opposite sides of the cup 10 but are identical in construction. Therefore, only one such ramp is described. Each ramp has a ramp base, or bottom end 25, and a ramp top or upper end 26. The ramp base 25 is located proximate the bottom edge of the side wall 16, and the ramp top 26 is located proximate the top edge of the side wall 16. The ramps 24a, 24b have respective upper ramp surfaces 30a, 30b, which are generally upwardly directed and have a substantially constant slope between the ramp base 25 and the ramp top 26. In the first preferred embodiment, the ramps 24a, 24b are oppositely disposed on the inside surface 20 of the wall 16. Also, in the first preferred embodiment, the ramps 24a, 24b traverse substantially the same distance from the bottom margin of the wall 16 to the top margin of the wall 16 along the inside surface 20. It will be understood by those skilled in the art that the ramps 24a, 24b may have a greater or lesser slope, which in turn would result in shorter or longer distances, respectively, traveled from the bottom margin to the top margin of the wall 16.

The ramps 24a, 24b have a slope great enough so that the ramps 24a, 24b do not extend more than half the circumference of the wall 16, as seen in FIG. 2. Also, the ramps 24a, 24b do not overlap each other. That is, the ramp 24a does not rise over the ramp 246 on the inside surface 20 of the wall 16. In the first preferred embodiment of the measuring cup 10, the side wall 16 is substantially normal to the base 18, so that the cup 10 is generally cylindrical in shape. In the illustrated embodiment the side wall 16 is slightly oval in transverse cross section but it could be circular or have other shapes. It will be understood by those skilled in the art that the wall 16 may angle away from the perimeter of the base 18 so that the measuring cup 10 may receive a second measuring cup (not shown) therein, i.e., allow plural measuring cups 10 to stack inside each other.

Each of the ramps 24a, 24b is provided with volume indicia 27a, 27a, on the upwardly directed surface 30a, 30b, so a user may easily look down toward the measuring cup 10 from above and view the volume level of the contents 28 within the cup 10. In the first preferred embodiment, the ramp 24a is provided with metric indicia 27a on ramp surface 30a, and ramp 24b is provided with standard English indicia 27a on ramp surface 30b. It will be understood by those skilled in the art that the indicia 27a, 27a may be spaced differently relative to each unit of measurement on respective ramps 24, 24b, depending on the desired slope of the ramps 24a, 24b.

The side wall 16 has portions below the ramps 24a, 24b integral with the lateral inner edges of the ramp surfaces 30a, 30b, and portions above the ramps integral with the lateral outer edges of the ramp surfaces 30a, 30b.

Figure 4:
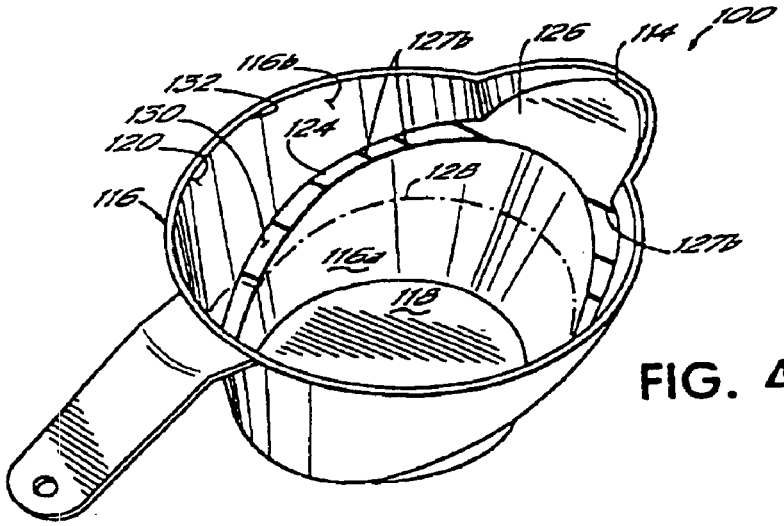
FIG. 4 is a perspective view of a second embodiment of the present inventive measuring cup.
Figure 5:
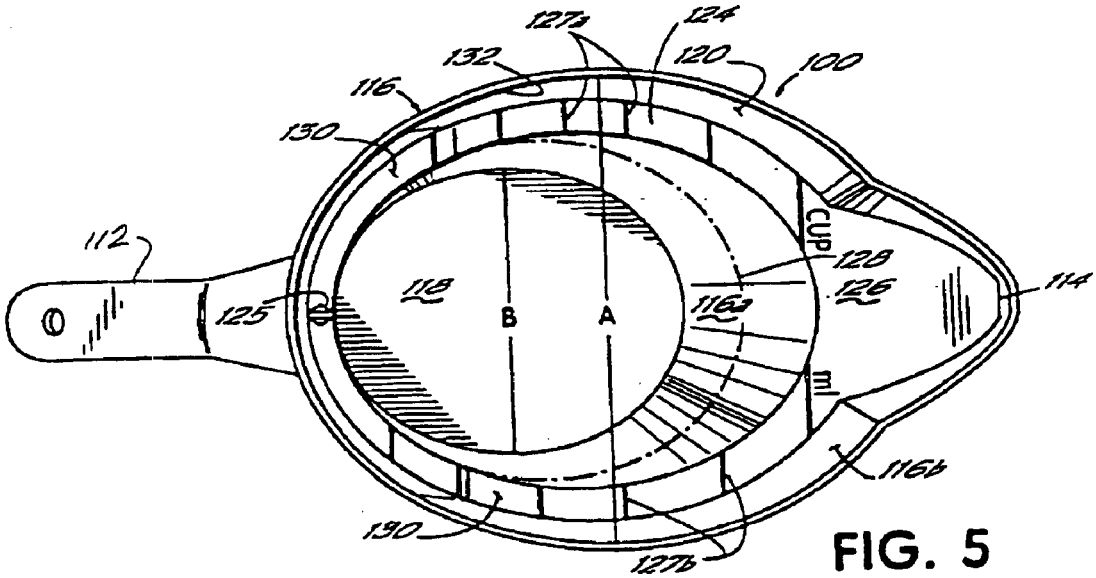
FIG. 5 is a top plan view of the measuring cup of FIG. 4.
Figure 6:
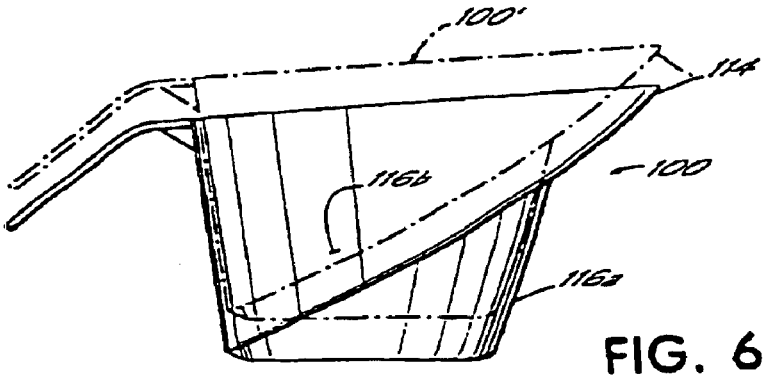
FIG. 6 is a side view of the measuring cup of FIG. 4 illustrating the nesting feature thereof.

FIGS. 4–6 show a second preferred embodiment of an inventive measuring cup 100. The measuring cup 100 has wall structure including a side wall 116 integral with a bottom wall or base 118 for cooperation therewith to define a cavity with an open upper end 132 having a width A larger than the width B of the bottom wall or base 118. Thus, the side wall 116 slopes outwardly away from the base 118 as the side wall 116 rises from its bottom edge to its top edge so that at least a second measuring cup 100' (FIG. 6) can be stacked within the measuring cup 100. The cup 100 has a handle 112 projecting from the side wall 116 adjacent to its upper end, and a spout 114 projecting from the upper end of the side wall 116 opposite the handle 112, the spout 114 having a lower entry end and an upper exit end at the open upper end 132. The measuring cup 100 has a pair of oppositely located, but identically sloped ramps 124 which are substantially continuous around the side wall inside surface 120 from the ramp bottom 125 toward the ramp top 126. That is, both ramps 124 rise symmetrically along the inside surface 120 of the side wall 116 from about the bottom edge of the side wall inside surface 120 generally opposite the spout 114 to near the top edge of the side wall 116 adjacent to the base of the spout 114.

Because the open upper end 132 has a greater width A than the width B of the base 118, upper surfaces 130 of the ramps 124 bear indicia 127a, 127a which are not spaced in equal intervals. That is, a given rise in level 128 of the contents near the bottom edge of the side wall 116 requires a smaller volume than an equal rise in the level of the contents near the upper edge of the side wall 116. As a result, the indicia 127a, 127a are spaced upon the ramps 124 closer together near the top edge of the side wall 116 than at the bottom edge for an equivalent volume of contents 128. It will be understood by those skilled in the art that the progressive change in the diameter of the measuring cup 100 from the base 118 to the upper edge of the side wall 116 may also be accommodated by decreasing the slope of the ramps 124 from the lower edge of the side wall 116 to the upper edge of the side wall 116 while maintaining the spacing between indicia 127a, 127a along the ramps 124.

Also in this embodiment, the ramp tops 126 are continuous with an inner surface of the spout 114 to allow a user to more easily pour contents from the measuring cup 100 without spilling.

The side wall 116 has a lower portion 116a below the ramps 124 which is offset inwardly by the width of the ramp upper surfaces 130 from an upper portion 116b of the side wall 116. This offset allows other measuring cups 100' to nest within the measuring cup 100 and each other when stacked. More specifically, the lower portion 116a of the side wall 116, which is below the ramps 124, is integral with the lateral inner edges of the ramps, while the upper portion 116b, which is above the ramps, is integral with the lateral outer edges of the ramps.

Figure 7:
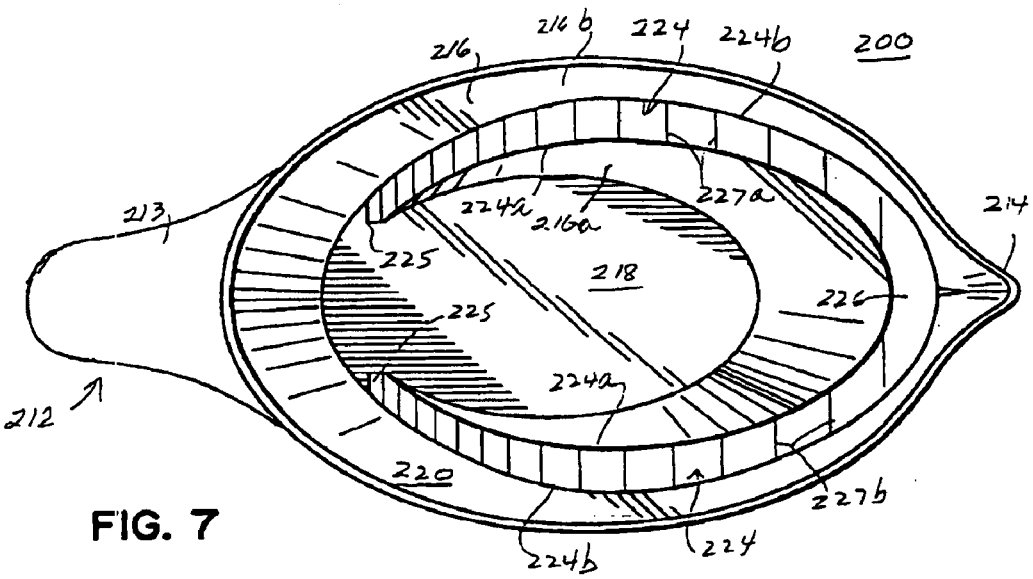
FIG. 7 is a top plan view of another embodiment of measuring cup.
Figure 8:
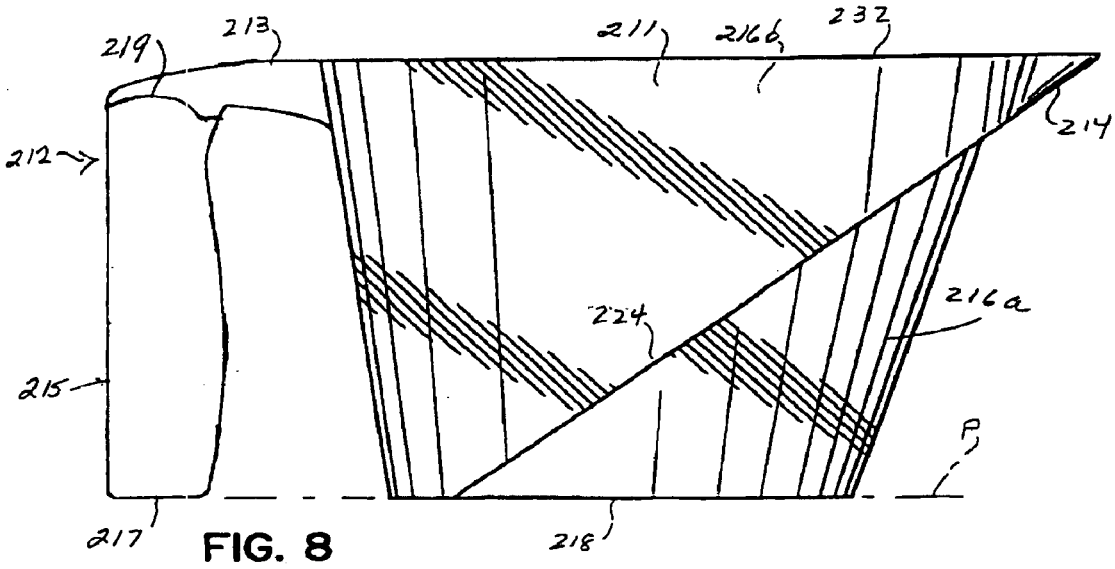
FIG. 8 is a side elevational view of the measuring cup of FIG. 7.

FIGS. 7 and 8 show another embodiment of an inventive measuring cup 200. The measuring cup 200 has wall structure including a side wall 216 integral with a bottom wall or base 218 for cooperation therewith to define a cavity with an open upper end 232 having a width larger than the width of the bottom wall or base 218. Thus, the side wall 216 slopes outwardly away from the base 218 as the side wall 216 rises from its bottom edge to its top edge. The cup 200 has a handle 212 projecting from the side wall 216 adjacent to its upper end, and a spout 214 projecting from the upper end of the side wall 216 opposite the handle 212, the spout 214 having a lower entry end and an upper exit end at the open upper end 232. The measuring cup 200 has a pair of oppositely located, but identically sloped ramps 224 which are substantially continuous around the side wall inside surface 220 from the ramp bottom 225 toward the ramp top 226. That is, both ramps 224 rise symmetrically along the inside surface 220 of the side wall 216 from about the bottom edge of the side wall inside surface 220 generally opposite the spout 214 to near the top edge of the side wall 216 adjacent to the base of the spout 214.

Because the open upper end 232 has a greater width than the width of the base 218, upper surfaces 230 of the ramps 224 bear indicia 227a, 227a which are not spaced in equal intervals for the same reasons indicated above for the cup 100. It will be understood by those skilled in the art that the progressive change in the diameter of the measuring cup 200 from the base 218 to the upper edge of the side wall 226 may also be accommodated by decreasing the slope of the ramps 224 from the lower edge of the side wall 216 to the upper edge of the side wall 216 while maintaining the spacing between indicia 227a, 227a along the ramps 224.

The side wall 216 has a lower portion 216a below the ramps 224 which is offset inwardly by the width of the ramp upper surfaces 230 from an upper portion 216b of the side wall 216. More specifically, the lower portion 216a of the side wall 216, which is below the ramps 224, is integral with the lateral inner edges 224a of the ramps, while the upper portion 216b, which is above the ramps, is integral with the lateral outer edges 224b of the ramps.

The periphery of the bottom wall 218 lies in a base plane P to provide a stable support on an underlying support surface. The handle 212 is generally L-shaped, having a short arm 213 projecting laterally outwardly from the side wall 216 and integral at the outer end thereof with an elongated depending grip portion 215 which extends substantially perpendicular to the base plane P and terminates at a generally flat distal end 217 which lies substantially in the base plane P. Thus, when the measuring cup 200 is resting on its base or bottom wall 218, the end 217 provides an additional support point. Furthermore, the depending portion 215 of the handle 212 is covered with a grip sheath 219, preferably formed of a suitable flexible and cushioning elastomeric material, such as that sold under the trade name SANTOPRENE. This affords a comfortable, non-slip, frictional grip surface to facilitate grasping of the handle 212.

While in the disclosed embodiments the ramps have fixed or constant slopes, it will be appreciated that the slopes could vary. Also, while each of the disclosed embodiments has two ramps, a single ramp could suffice. Preferably, the entire measuring cup is formed of a transparent material, but, if desired, the ramps could be translucent to enhance contrast with the vessel side walls.

While the illustrated embodiments are cups, it will be appreciated that the principles of the invention are applicable to other vessels, such as bowls, ladles, spoons and the like and, indeed, to any vessel-defining structure, whether or not self-supporting and whether or not provided with a handle or a spout, and of any size or shape.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

[1. A vessel comprising:

a wall structure defining a cavity with an open upper end for receiving contents having a measurable volume, a continuous ramp extending upwardly from adjacent to a lower end of the wall structure, and indicia positioned on the ramp so as to be observable by a user looking downwardly toward the open upper end and providing a readily observable indication of the volume of the contents of the vessel.]

2. The vessel of claim [1]*39*, wherein the wall structure is self-supporting.

3. The vessel of claim [1]*39*, wherein the wall structure includes a bottom wall and an upstanding side wall.

4. The vessel of claim 3, wherein the side wall is substantially cylindrical in shape.

5. The vessel of claim 3, wherein the side wall is non-cylindrical in shape.

6. The vessel of claim 3, wherein the bottom wall and the open upper end are of substantially the same size.

7. The vessel of claim 3, wherein the open upper end is larger than the bottom wall.

8. The vessel of claim [1]*39*, wherein each of the bottom wall and the open upper end is generally oval in shape.

9. The vessel of claim 3, wherein the ramp extends from the bottom wall to the open upper end.

10. The vessel of claim [1]*39*, wherein the wall structure is formed of a light-transmitting material.

11. The vessel of claim 10, wherein the wall structure is transparent and the ramp is translucent.

12. The vessel of claim [1]*39*, wherein the wall structure is of unitary one-piece construction.

13. The vessel of claim [1]*39*, wherein the ramp is integral with the wall structure.

14. The vessel of claim 13, wherein the ramp has an upper surface facing the open upper end, the indicia being disposed on the upper surface.

[15. The vessel of claim 14, wherein the ramp has laterally inner and outer edges, the wall structure including a portion above the ramp integral with the outer edge thereof and a portion below the ramp integral with the inner edge thereof.]

16. The vessel of claim [1]*39*, wherein the ramp has a constant slope.

17. The vessel of claim [1]*39*, and further comprising a spout projecting outwardly from the wall structure and having an exit end at the open upper end and an entry end.

18. The vessel of claim 17, wherein the ramp extends from a lower end of the wall structure to the entry end of the spout.

19. The vessel of claim 17, wherein the ramp has an upper surface on which the indicia are disposed facing the open upper end, the spout having an inner surface continuous with the upper surface of the ramp.

20. The vessel of claim [1]*39*, and further comprising a handle extending outwardly from the wall structure.

21. The vessel of claim 20, and further comprising a spout on the wall structure opposite from the handle.

22. The vessel of claim 20, wherein the wall structure has a lower end lying in a base plane, the handle having a distal end spaced from the wall structure and disposed in the base plane.

23. The vessel of claim 22, wherein the handle includes an elongated portion extending substantially perpendicular to the base plane.

24. The measuring vessel of claim 20, and further comprising a grip sheath of elastomeric material disposed on the handle.

25. A vessel comprising:

a wall structure defining a cavity with an open upper end for receiving contents having a measurable volume, first and second continuous ramps extending upwardly from adjacent to a lower end of the wall structure and respectively adjacent to opposite sides of the wall structure, and first and second indicia respectively positioned on the first and second ramps so as to be observable by a user looking downwardly toward the open upper end and providing readily observable indications of the volume of the contents of the vessel.

26. The vessel of claim 25, wherein the ramps are respectively disposed on opposite sides of the wall structure.

27. The vessel of claim 26, wherein each of the ramps is integral with the wall structure.

28. The vessel of claim 27, wherein each of the ramps has an upper surface facing the open upper end, the first and second indicia being respectively disposed on the upper surfaces of the ramps.

29. The vessel of claim 28, wherein each ramp has laterally inner and outer edges, the wall structure having a portion above the ramps integral with the outer edges and a portion below the ramps integral with the inner edges.

30. The vessel of claim 25, wherein the first indicia are different from the second indicia.

31. The vessel of claim 30, wherein the first indicia make up a scale in English units of measurement and the second indicia make up a scale in metric units of measurement.

32. The vessel of claim 25, wherein the ramps are joined at a common upper end.

33. The vessel of claim 32, and further comprising a spout projecting from the wall structure and having an exit end at the open upper end and an entry end therebelow, the upper end of the ramps being disposed at the entry end of the spout.

34. The vessel of claim 33, wherein the wall structure includes a bottom wall and an upstanding side wall integral with the bottom wall.

35. The vessel of claim 25, wherein the wall structure has a lower end lying in a base plane, and further comprising a handle projecting from the wall structure and having a distal end spaced from the wall structure and lying in the base plane.

36. The vessel of claim 35, and further comprising a grip sheath of elastomeric material disposed on the handle.

37. A vessel comprising:

a wall structure defining a cavity with an open upper end for receiving contents having a measurable volume, the wall structure having upstanding inner surface portions, a continuous ramp extending upwardly from adjacent to a lower end of the wall structure and laterally from the inner surface portions, and indicia positioned on the ramp so as to be observable by a user looking downwardly toward the open upper end and providing a readily observable indication of the volume of the contents of the vessel.

*38. A vessel comprising:*

*a wall structure defining a cavity with an open upper end for receiving contents having a measurable volume,*

*a continuous ramp extending upwardly from adjacent to a lower end of the wall structure wherein the ramp has laterally inner and outer edges,*

*the wall structure including a portion above the ramp integral with the outer edge thereof and a portion below the ramp integral with the inner edge thereof, and*

*indicia positioned on the ramp so as to be observable by a user looking downwardly toward the open upper end and providing a readily observable indication of the volume of the contents of the vessel.*

*39. A vessel comprising:*

*a wall structure defining a cavity with an open upper end for receiving contents having a measurable volume,*

*a continuous ramp extending upwardly from adjacent to a lower end of the wall structure, the cavity being wider above the ramp than below the ramp, and*

*indicia positioned on the ramp so as to be observable by a user looking downwardly toward the open upper end and providing a readily observable indication of the volume of the contents of the vessel.*

* * * * *